US 6,724,175 B1

(12) United States Patent
Matsuda et al.

(10) Patent No.: US 6,724,175 B1
(45) Date of Patent: Apr. 20, 2004

(54) POWER SUPPLY CONTROL DEVICE, POWER SUPPLY CIRCUIT, POWER SUPPLY CONTROL METHOD, AND ELECTRONIC APPARATUS CONTROLLING OUTPUT VOLTAGE THEREOF IN ACCORDANCE WITH A VOLTAGE DETECTED ACROSS AN ON SWITCHING ELEMENT

(75) Inventors: Kouichi Matsuda, Kawasaki (JP); Hidekiyo Ozawa, Kawasaki (JP); Kazuhiko Itakura, Kawasaki (JP); Kyuichi Takimoto, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/716,213

(22) Filed: Nov. 21, 2000

(30) Foreign Application Priority Data

Mar. 17, 2000 (JP) ......................... 2000-076994

(51) Int. Cl.$^7$ .............................. G05F 1/40; G05F 3/16
(52) U.S. Cl. ..................... 323/283; 323/224; 323/284
(58) Field of Search ........................ 323/283, 224, 323/284, 285

(56) References Cited

U.S. PATENT DOCUMENTS

| 5,436,824 A | | 7/1995 | Royner et al. | |
|---|---|---|---|---|
| 5,610,503 A | * | 3/1997 | Fogg et al. | .................. 323/283 |
| 5,808,457 A | * | 9/1998 | Rutkowski et al. | .......... 323/282 |
| 5,926,012 A | * | 7/1999 | Takizawa et al. | ........... 323/284 |
| 5,943,227 A | * | 8/1999 | Bryson et al. | ................. 363/95 |
| 6,091,232 A | * | 7/2000 | Criscione et al. | ............ 323/222 |
| 6,094,039 A | * | 7/2000 | Farrenkopf | .................... 323/283 |
| 6,166,528 A | * | 12/2000 | Rossetti et al. | .............. 323/283 |
| 6,281,667 B1 | * | 8/2001 | Matsumura | .................. 323/274 |
| 6,366,068 B1 | * | 4/2002 | Morishita | .................... 323/282 |

FOREIGN PATENT DOCUMENTS

| EP | 0 884 746 A2 | 12/1998 |
|---|---|---|
| JP | 5-38134 | 2/1993 |
| JP | 5-038134 | 2/1993 |
| JP | 5-304768 | 11/1993 |
| JP | 6-201738 | 7/1994 |
| JP | 6-311734 | 11/1994 |
| JP | 9-084280 | 3/1997 |
| JP | 10-341570 | 12/1998 |
| JP | 11-146637 | 5/1999 |

* cited by examiner

Primary Examiner—Shawn Riley
(74) Attorney, Agent, or Firm—Staas & Halsey LLP

(57) ABSTRACT

A power supply control device, a power supply control circuit, a power supply control method, and an electronic apparatus wherein a determination is made of whether or not a switching element therein is in an ON state. When the switching element is in the ON state, a voltage generated across the switching element is detected in accordance with a current flowing through the switching element. In accordance with the detected voltage, the switching element is controlled and thereby an output voltage is controlled.

47 Claims, 15 Drawing Sheets

FIG.10A ERROR AMPLIFIER 13 OUTPUT

POWER SUPPLY CONTROL DEVICE, POWER SUPPLY CIRCUIT, POWER SUPPLY CONTROL METHOD, AND ELECTRONIC APPARATUS CONTROLLING OUTPUT VOLTAGE THEREOF IN ACCORDANCE WITH A VOLTAGE DETECTED ACROSS AN ON SWITCHING ELEMENT

BACKGROUND OF THE INVENTION

1. Field of the Invention

The present invention generally relates to power supply control devices, power supply circuits, power supply control methods, and electronic apparatuses. More particularly, the present invention relates to a power supply control device, a power supply circuit, a power supply control method, and an electronic apparatus, in which current to be supplied to a load is controlled by a transistor disposed between a power source and the load.

2. Description of the Related Art

In recent years, portable electronic apparatuses have been widespread. A portable electronic apparatus operates with a battery unit as its power source. Accordingly, the operating time of the apparatus by the battery unit is an important factor in measuring the performance of the apparatus. Such a portable electronic apparatus does not drive an internal circuit with the voltage of the battery unit. Therefore, a power supply circuit that converts the voltage of the battery unit into a voltage suitable for the internal circuit is contained in the apparatus.

It is preferable that the power consumption of the apparatus be reduced so as to prolong the operation time, while high efficiency is maintained in the power supply circuit. However, a high-efficient power supply circuit consumes a large amount of power.

Conventionally, synchronous DC-DC converters are used to improve the efficiency of a power supply circuit. As the performance of the CPUs contained in electronic apparatuses has been increased, the power consumption has been becoming larger. To restrict such an increase in power consumption, the voltage used in an electronic apparatus has been decreasing. As a result, the output of a DC-DC converter has become low-voltage, large-current output.

In view of this, it is essential to protect a DC-DC converter when short-circuiting or overloading occurs. Example methods of protecting a DC-DC converter from short-circuiting and overloading includes: a constant current control method in which the maximum value of the output current of the DC-DC converter is restricted through monitoring the output current; and an excess current preventing circuit method in which, the instant an excess current is detected, the DC-DC converter is stopped.

Generally, a current sense resistor is disposed in the output circuit of the DC-DC converter so as to monitor the voltage caused by the current flowing through such a current sense resistor. In a portable electronic apparatus, a battery unit is used as a power source for the internal devices. As a battery keeps discharging, the voltage of the battery normally drops. Therefore, DC-DC converters are employed to maintain the voltage used in an electronic apparatus at a constant value.

In a notebook-type computer, for instance, various devices such as a semiconductor device, a storage device, and a display device are mounted. These devices operate at different voltages from each other. More specifically, devices such as a HDD, CD-ROM, and DVD operate at 5.0 V, while a memory and a semiconductor device for controlling peripheral circuits operate at 3.3 V, for instance. As for the CPU, the operating voltage is 0.9 to 2.0 V.

Meanwhile, power is supplied to such a notebook-type computer from an external power source such as an AC adapter, or from a battery unit contained in the apparatus. In this case, a DC-DC converter is employed to produce various voltages required by the devices in the apparatus.

For such a DC-DC converter, a switching regulator type is widely used for its high efficiency. In a DC-DC converter of the switching regulator type, a transistor is disposed between a power source and a load, and this transistor is controlled so as to control the output voltage. To detect the current to be supplied to the load, a current sense resistor is connected in series between the transistor and the load. As the current to be supplied to the load flows through the current sense resistor, a voltage corresponding to the current is generated across the current sense resistor. By detecting this voltage generated across the current sense resistor, the current to be supplied to the load can be detected. Using the detected current, a control operation such as an excess current preventing operation is performed.

FIG. 1 is a block diagram of a power system of an electronic apparatus.

In a portable electronic apparatus 1, such as a notebook computer, a commercial AC power supply 3 is converted into a DC power supply by an AC adapter 2, and the DC power supply is generally used as the driving power. The conversion is externally carried out. The electronic apparatus 1 comprises a battery unit 5, a charger 6, diodes D11 and D12, and DC-DC converters 7-1 to 7-3. With this structure, the DC power from the AC adapter 2 is supplied to internal units 4-1 to 4-3.

The battery unit 5 is used as the driving power when the electronic apparatus 1 is being carried. The charger 6 recharges the battery unit 5 with external power from the AC adapter 2.

The diode D11 prevents power supply from the battery unit 5 to the AC adapter 2. The diode D12 prevents direct voltage application from the AC adapter 2 to the battery unit while the AC adapter 2 is connected to the electronic apparatus 1.

The DC-DC converter 7-1 converts DC voltage from the AC adapter 2 or the battery unit 5 into DC voltage demanded by the internal unit 4-1, and then supplies the converted DC voltage to the internal unit 4-1. The DC-DC converter 7-2 converts DC voltage from the AC adapter 2 or the battery unit 5 into DC voltage demanded by the internal unit 4-2, and then supplies the converted DC voltage to the internal unit 4-2. The DC-DC converter 7-3 converts DC voltage from the AC adapter 2 or the battery unit 5 into DC voltage demanded by the internal unit 4-3, and then supplies the converted DC voltage to the internal unit 4-3.

FIG. 2 is a block diagram of conventional DC-DC converters.

The DC-DC converters 7-1 to 7-3 each comprise a power supply control IC 10, a main switching transistor Tr1, a synchronous rectifying transistor Tr2, diodes D1 and D2, a choke coil L1, a smoothing capacitor C1, a back-flow preventing capacitor C2, and a current sense resistor R1.

An input voltage Vin is supplied to an input terminal Tin. The input terminal Tin is connected to the power supply terminal Tvin of the power supply control IC 10 and the drain of the main switching transistor Tr1.

The main switching transistor Tr1 is constituted by an n-channel MOSFET (Metal Oxide Semiconductor Field Effect Transistor). The drain of the main switching transistor Tr1 is connected to the input terminal Tin, while the source is connected to an output terminal Tout via the choke coil L1 and the current sense resistor R1. The gate of the main switching transistor Tr1 is connected to a terminal Tdh of the power supply control IC 10. The main switching transistor Tr1 is switched on and off, depending on a pulse supplied from the terminal Tdh of the power supply control IC 10.

The output current of the main switching transistor Tr1 is supplied to the choke coil L1. The choke coil L1, the synchronous commutating transistor Tr2, and the diode D2 constitute a rectifier circuit that rectifies the pulse-type output current from the main switching transistor Tr1.

The anode of the diode D1 is grounded, and the cathode of the diode D1 is connected to the choke coil L1. The diode D1 is a flywheel diode that supplies forward current to the choke coil L1 when the main switching transistor Tr1 is switched off, and is provided with reverse voltage and switched off when the main switching transistor Tr1 is on.

The synchronous rectifying transistor Tr2 is constituted by an n-channel MOSFET (Metal Oxide Semiconductor Field Effect Transistor). The drain of the synchronous rectifying transistor Tr2 is connected to the source of the main switching transistor Tr1, while the source thereof is grounded. The gate of the synchronous rectifying transistor Tr2 is connected to a terminal Td1 of the power supply control IC 10. The synchronous rectifying transistor Tr2 is switched off by the power supply control IC 10 when the main switching transistor Tr1 is switched on, and is switched on by the power supply control IC 10 when the main switching transistor Tr1 is switched off. The synchronous rectifying transistor Tr2 is switched on when the forward current flows through the diode D1, so as to reduce a voltage decrease due to the forward voltage of the diode D1.

The current rectified by the choke coil L1, the diode D1, and the synchronous transistor Tr2 is supplied to the output terminal Tout via the resistance R1 of the current sense resistor R1. The connection point between the choke coil L1 and the current sense resistor R1 is connected to a terminal Tcs of the power supply control IC 10.

The output terminal Tout is connected to the ground via the smoothing capacitor C1, as well as to a terminal Tfb of the power supply control IC 10. The smoothing capacitor C1 smoothens current supplies from the choke coil L1 via the current sense resistor R1.

Furthermore, a driving power terminal Tvg is connected to a terminal Tvb of the power supply control IC 10. A gate driving voltage VG is applied to the driving power terminal Tvg. A terminal Tcb of the power supply control IC 10 is connected to the connection point between the diode D2 and the back-flow preventing capacitor C2. The anode of the diode D2 is connected to the driving power terminal Tvg, while the cathode thereof is connected to the back-flow preventing capacitor C2. The diode D2 prevents the current from flowing back toward the terminal Tvg when the voltage of a terminal Tcb is increased by the back-flow preventing capacitor C2. One end of the back-flow preventing capacitor C2 is connected to the connection point between the cathode terminal of the diode D2 and the terminal Tcb, while the other end thereof is connected to the connection point of the source of the main switching transistor Tr1, the drain of the synchronous rectifying transistor Tr2, the cathode of the diode D1, and one end of the choke coil L1.

Referring now to FIG. 3, the power supply control IC 10 will be described in greater detail.

The power supply control IC 10 comprises a differential amplifier 11 (AMP1), error amplifiers 12 and 13 (ERA2 and ERA1), a saw-tooth oscillator 14, a PWM, (Pulse Width Modulation) comparator 15, drive amplifiers 16 and 17 (DRV1 and DRV2), reference voltage source 18 and 19, and resistors R2 and R3.

The non-inverting input terminal of the differential amplifier 11 is connected to the terminal Tcs, while the inverting input terminal thereof is connected to the terminal Tfb. Accordingly, the differential amplifier 11 outputs a differential signal in accordance with the potential difference between the terminal Tcs and the terminal Tfb. The terminal Tcs and the terminal Tfb are connected to both ends of the current sense resistor R1 outside the power supply control IC 10. Accordingly, the differential signal outputted from the differential amplifier 11 depends on the current flowing through the current sense resistor R1.

The differential signal outputted from the differential amplifier 11 is supplied to the inverting input terminal of the error amplifier 12. A reference voltage e2 generated from the reference voltage source 18 is applied to the non-inverting input terminal of the error amplifier 12. The error amplifier outputs a signal that varies depending on the difference between the differential signal outputted from the differential amplifier 11 and the reference voltage e2. Accordingly, the output of the error amplifier 12 is small when the current flowing through the current sense resistor R1 is great. On the other hand, the output of the error amplifier 12 is great when the current flowing through the current sense resistor R1 is small. The output signal of the error amplifier 12 is supplied to a non-inverting input terminal of the PWM comparator 15.

A divided voltage between the resistors R2 and R3 is supplied to the inverting input terminal of the error amplifier 13, while a reference voltage e1 of the reference voltage source 19 is supplied to the non-inverting input terminal. The resistors R2 and R3 are connected in series between the terminal Tfb and the terminal Tgnd, so as to divide the voltage applied to the terminal Tfb. The terminal Tfb is connected to the output terminal Tout outside the power supply control IC 10. The resistors R2 and R3 divide the output voltage Vout, and supply it to the error amplifier 13.

The error amplifier 13 outputs a value that is obtained by subtracting the divided voltage between the resistors R2 and R3 from the reference voltage e1 generated from the reference voltage source 19. When the output voltage Vout of the output terminal Tout is small, the output of the error amplifier 13 is great. On the other hand, when the output voltage Vout of the output terminal Tout is great, the output of the error amplifier 13 is small. The output of the error amplifier 13 is supplied to a non-inverting input terminal of the PWM comparator 15.

A saw-tooth signal is supplied from the saw-tooth oscillator 14 to an inverting input terminal of the PWM comparator 15. The PWM comparator 15 compares the saw-tooth signal with the signals outputted from the error amplifiers 12 and 13, so as to output a pulse in accordance with the comparison result. The PWM comparator 15 compares one of the outputs of the error amplifier 12 and 13, whichever is smaller, with the saw-tooth wave generated from the saw-tooth oscillator 14. The PWM comparator then outputs a pulse that is high when the smaller output between the error amplifiers 12 and 13 is smaller than the saw-tooth wave, and low when the smaller output between the error amplifiers 12 and 13 is greater than the saw-tooth wave.

FIG. 4 is an operation waveform chart of a conventional power supply control IC when performing voltage control.

FIG. 5 is an operation waveform chart of another conventional power supply control IC when performing current control. In FIGS. 4 and 5, (A) shows the output waveforms of the error amplifiers 12 and 13, and the saw-tooth oscillator 14, and (B) shows the output waveform of the PWM comparator 15.

When the output current Iout is relatively small and the output voltage Vout is high, the output ERA1 of the error amplifier 13 and the saw-tooth wave are compared, as shown in FIG. 4A. The pulse outputted from the PWM comparator 15 varies in duty ratio of the high level to the low level, depending on the output ERA1 of the error amplifier 13, as shown in FIG. 4B. When the output voltage Vout is high, the pulse outputted from the PWM comparator 15 has a smaller pulse width at the high level and a greater pulse width at the low level. When the output voltage Vout is low, the pulse outputted from the PWM comparator 15 has a greater pulse width at the high level and has a smaller pulse width at the low level.

When the output voltage Vout is relatively low and the output current Iout is great, the output ERA2 of the error amplifier 12 and the saw-tooth wave are compared, as shown in FIG. 5A. The pulse outputted from the PWM comparator 15 varies in duty ratio of the high level to the low level, depending on the output ERA2 of the error amplifier 12, as shown in FIG. 5B. When the output current Iout is great, the pulse outputted from the PWM comparator 15 has a smaller pulse width at the high level and has a greater pulse width at the low level. When the output current Iout is small, the pulse outputted from the PWM comparator 15 has a greater pulse width at the high level and has a smaller pulse width at the low level.

The PWM comparator 15 supplies its output pulse to the drive amplifier 16. The drive amplifier 16 is connected to the terminal Tcb and the terminal Tv1, and is driven in accordance with the potential difference between the terminal Tcb and the terminal Tv1. The drive amplifier 16 generates a driving signal from the output pulse of the PWM comparator 15. The driving signal is used for driving the main switching transistor Tr1. The output of the drive amplifier 16 is outputted through the terminal Tdh. The terminal Tdh of the power supply control IC 10 is connected to the gate of the main switching transistor Tr1, so that a pulse that depends on the output pulse of the PWM comparator 15 can be supplied from the terminal Tdh to the gate of the main switching transistor Tr1.

The main switching transistor Tr1 is switched on when the pulse supplied from the terminal Tdh is high, and is switched off when the pulse supplied from the terminal Tdh is low.

Aside from the output pulse, the PWM comparator 15 also outputs an inverted output pulse that is obtained by inverting the output pulse. The inverted output pulse is supplied to the drive amplifier 17. The drive amplifier 17 is connected to the terminal Tvb, and is driven by the driving voltage VG supplied to the terminal Tvb. From the inverted output pulse, the drive amplifier 17 generates a driving signal for driving the synchronous rectifying transistor Tr2. The output of the drive amplifier 17 is outputted through the terminal Td1 of the power supply control IC 10. The terminal Td1 of the power supply control IC 10 is connected to the gate of the synchronous rectifying transistor Tr2, so that a pulse that depends on the inverted output pulse can be supplied to the gate of the synchronous rectifying transistor Tr2. The synchronous rectifying transistor Tr2 is switched on when the pulse supplied from the terminal Td1 is high, and is switched off when the pulse supplied from the terminal Td1 is low.

The pulse supplied to the gate of the synchronous rectifying transistor Tr2 is equal to a pulse obtained by inverting the pulse supplied to the gate of the main switching transistor Tr1. Accordingly, when the main switching transistor Tr1 is in the ON state, the synchronous rectifying transistor Tr2 is in the OFF state. On the other hand, when the main switching transistor Tr1 is in the OFF state, the synchronous rectifying transistor Tr2 is in the ON state.

In the above power supply control IC 10, the following relationship is satisfied:

$$Vout = [Ton/(Ton+Toff)] \times Vin = (Ton/T0) \times Vin$$

wherein Vout is the output voltage, Ton is the duration of the main switching transistor in the ON state, Toff is the duration of the main switching transistor Tr1 in the OFF state, and (Ton+Toff)=T0.

The following relationship is also satisfied:

$$Iin = (Ton/T0) \times Iout$$

wherein Iin is the average input current, and Iout is the output current.

In accordance with the above expressions, the output voltage Vout and the output current Iout can be constantly controlled by controlling the duty ratio in the main switching transistor Tr1 with the power supply control IC 10.

As described so far, the power supply control IC 10 having the above structure measures the output voltage Vout and the output current Iout. In accordance with the comparison between the output voltage Vout and the output current Iout, the main switching transistor Tr1 and the synchronous rectifying transistor Tr2 are controlled. However, the control operation is performed in accordance with the output voltage Vout, and power supply control ICs that perform a current control operation in an excess current state.

FIG. 6 is a block diagram of another conventional power supply control IC. In this figure, the same components as in FIG. 3 are denoted by the same reference numerals, and an explanation for those components is omitted.

A power supply control IC 21 comprises a comparator 22, a reference voltage source 23, a flip-flop 24, an OR gate 25, and an AND gate 26, in place of the differential amplifier 11, the error amplifier 12, and the reference voltage source 18 of FIG. 3.

The non-inverting input terminal of the comparator 22 is connected to the terminal Tcs, while the inverting input terminal thereof is connected to the terminal Tfb via the reference voltage source 23. The reference voltage source 23 generates a reference voltage e11. When the voltage at either end of the current sense resistor R1 is higher than the reference voltage e11, the comparator 22 outputs a high-level signal. On the other hand, when the voltage at either end of the current sense resistor R1 is lower than the reference voltage e11, the comparator 22 outputs a low-level signal. The flip-flop 24 is an R-S flip-flop. The output of the comparator 22 is supplied to the set terminal S of the flip-flop 24, and the saw-tooth wave outputted from the saw-tooth oscillator 14 is supplied to the reset terminal R of the flip-flop 24.

When the output of the comparator 22 becomes high, the flip-flop 24 is set. When the saw-tooth wave outputted from the saw-tooth oscillator 14 reaches a predetermined level, the flip-flop 24 is reset. Once the flip-flop 24 is set, it keeps outputting a high-level signal until it is reset. The flip-flop 24 outputs a non-inverted output Q and an inverted output *Q. The non-inverted output Q is supplied to the OR gate 25, while the inverted output *Q is supplied to the AND gate 26.

The non-inverted output Q of the flip-flop 24 and the inverted output of the PWM comparator 15 are supplied to the OR gate 25. The OR gate 25 performs an OR logic operation on the non-inverted output Q of the flip-flop 24 and the inverted output of the PWM comparator 15. The output signal of the OR gate 25 is supplied to the drive amplifier 17.

Meanwhile, the inverted output *Q of the flip-flop 24 and the non-inverted output of the PWM comparator 15 are supplied to the AND gate 26. The AND gate 26 performs an AND logic operation on the inverted output *Q of the flip-flop 24 and the non-inverting output of the PWM comparator 15. The output signal of the AND gate 26 is supplied to the drive amplifier 16.

When the voltage generated at either end of the current sense resistor R1 is higher than the reference voltage e11, the flip-flop 24 is set. When the flip-flop 24 is set, the non-inverted output of the flip-flop 24 becomes high, and the non-inverted output thereof becomes low.

When the non-inverted output of the flip-flop 24 becomes high, the output of the OR gate 25 also becomes high, regardless of whether the inverted output of the PWM comparator 15 is high or low. Accordingly, the output of the terminal Td1 remains high. While the output of the terminal Td1 is high, the synchronous rectifying transistor Tr2 remains in the ON state.

When the inverted output of the flip-flop 24 becomes low, the output of the AND gate 26 also becomes low, regardless of whether the non-inverted output of the PWM comparator 15 is high or low. Accordingly, the output of the terminal Tdh remains low. While the output of the terminal Tdh is low, the main switching transistor Tr1 remains in the OFF state. In this manner, the output current Iout is restricted so as to eliminate excess current.

When the output of the saw-tooth oscillator 14 reaches a predetermined level, the flip-flop 24 is reset. If an excess current has been eliminated at this point, the flip-flop 24 remains in the reset state, and the regular voltage control is performed. On the other hand, if an excess current has not been eliminated at this point, the flip-flop 24 is set again, and the main switching transistor Tr1 remains in the OFF state, thereby continuing the excess current eliminating operation.

In this structure, the main switching transistor Tr1 is switched off when excess current is detected, and the voltage control operation is performed when the excess current is eliminated. However, once the main switching transistor Tr1 is switched off when excess current is detected, it may remain in the OFF state until power supply is resumed, even if the excess current is eliminated.

FIG. 7 is a block diagram of yet another conventional power supply control IC. In this figure, the same components as in FIG. 6 are denoted by the same reference numerals.

A power supply control IC 31 is characterized by the flip-flop 24 that is not reset by the saw-tooth wave generated from the saw-tooth oscillator 14.

In any of the conventional power supply control ICs described so far, the current sense resistor is connected in series between the main switching transistor and a load. As a result, there is a problem of power loss caused by the current sense resistor. Such power loss becomes larger as the output current becomes greater.

To reduce power loss caused by the current sense resistor, the current sense resistor should be made smaller. However, even if the resistance value of the current sense resistor is very small, the power loss cannot be completely avoided. Also, a resistor having a small resistance value is costly.

Furthermore, the current sense resistor is normally formed by a discrete component, which takes up considerable space.

SUMMARY OF THE INVENTION

A general object of the present invention is to provide power supply control devices in which the above disadvantages are eliminated.

A more specific object of the present invention is to provide a power supply control device, a power supply circuit, a power supply control method, and an electronic apparatus that are not costly, do not take up too much space, and can reduce power loss.

The above objects of the present invention are achieved by a power supply control device which determines whether or not a switching element is in an ON state, detects a voltage generated across the switching element in accordance with a current flowing through the switching element when the switching element is in the ON state, and controls the switching element in accordance with the detected voltage, thereby controlling an output voltage.

The above objects of the present invention are also achieved by a power supply circuit, a power supply control method, or an electronic apparatus, which employs the above power supply control device.

In this power supply control device, whether or not the switching element is in the ON state is determined in accordance with a control signal for controlling the switching element. Alternatively, whether or not the switching element is in the ON state is determined in accordance with a result of a comparison between the gate-source voltage of the switching element and a reference voltage. In yet another embodiment, the potential difference between the output voltage and a first reference voltage is detected, and whether or not the switching element is in the ON state is determined in accordance with a result of a comparison between the detected potential difference and a second reference voltage. The second reference voltage can be set based on an externally supplied voltage.

In accordance with the present invention, an output current can be detected using the ON-resistance of the switching element, thereby eliminating the need for a current sense resistor and power loss due to such a current sense resistor. Thus, the power consumption and costs can be reduced.

Furthermore, the voltage for detecting an ON state is set at a suitable value by varying the external voltage, so as to determine whether or not the switching element is certainly in the ON state.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 8:
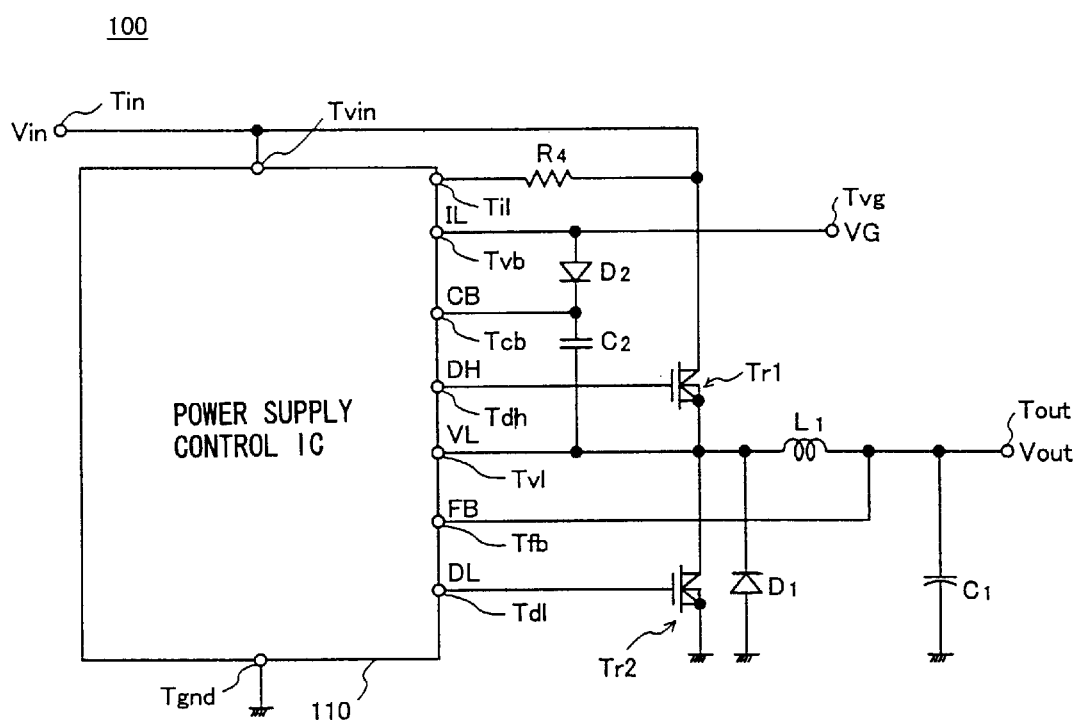
FIG. 8 is a block diagram of a DC-DC converter as one embodiment of the present invention.

FIG. 8 is a block diagram of a DC-DC converter as one embodiment of the present invention. In this figure, the same components as in FIG. 2 are denoted by the same reference numerals, and explanations for those components are omitted.

Figure 1:
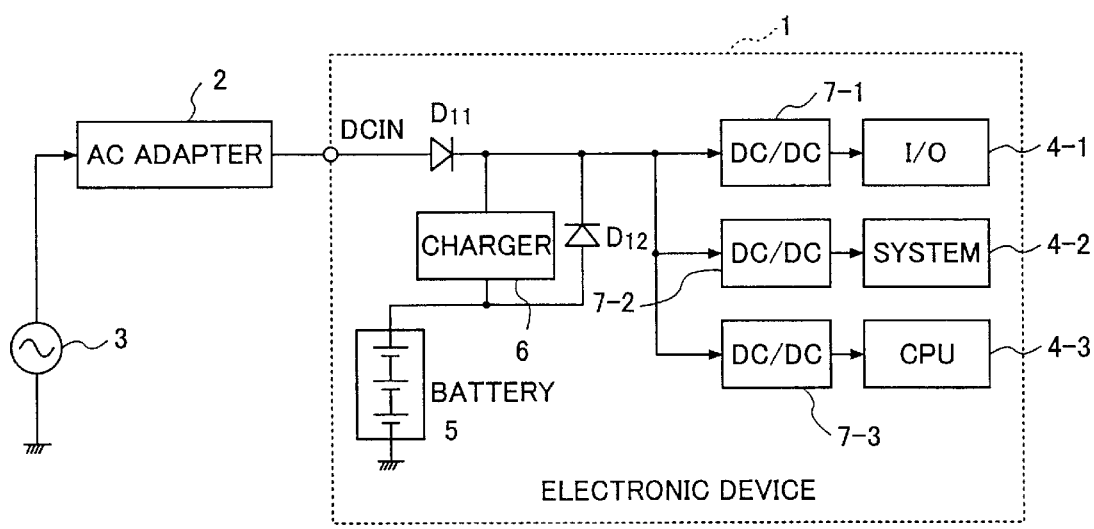
FIG. 1 is a block diagram of a conventional power system of an electronic apparatus.
Figure 3:
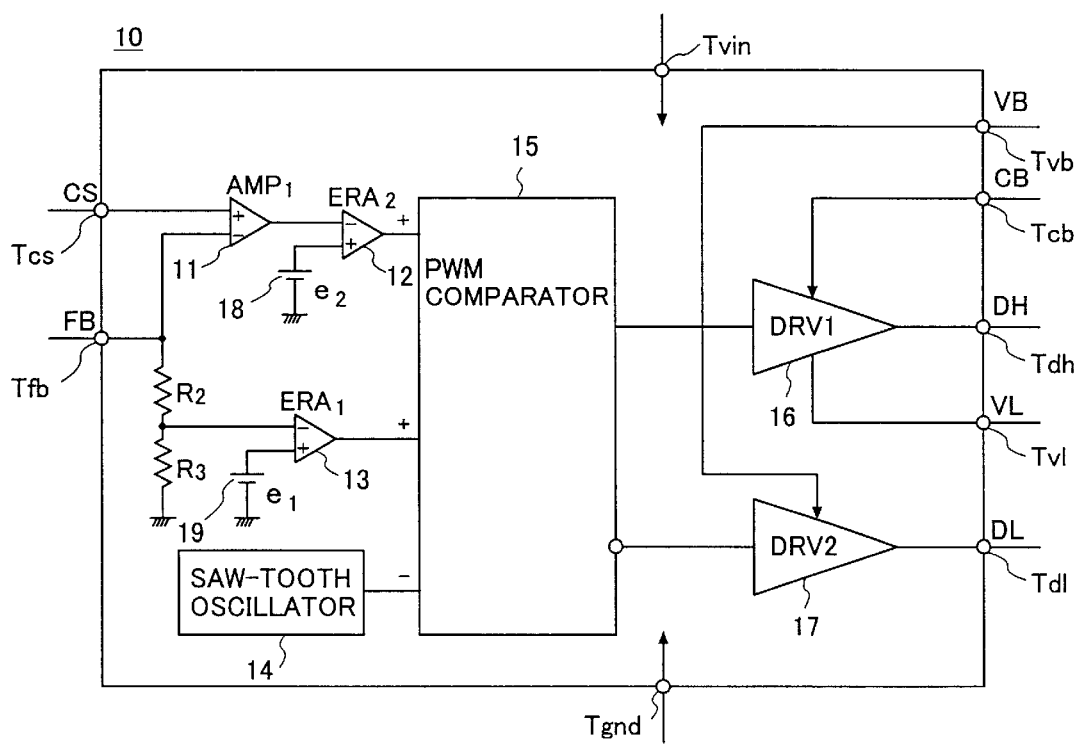
FIG. 3 is a block diagram of a power supply control IC of the conventional DC-DC converter of FIG. 2.
Figures 4A, 4B:
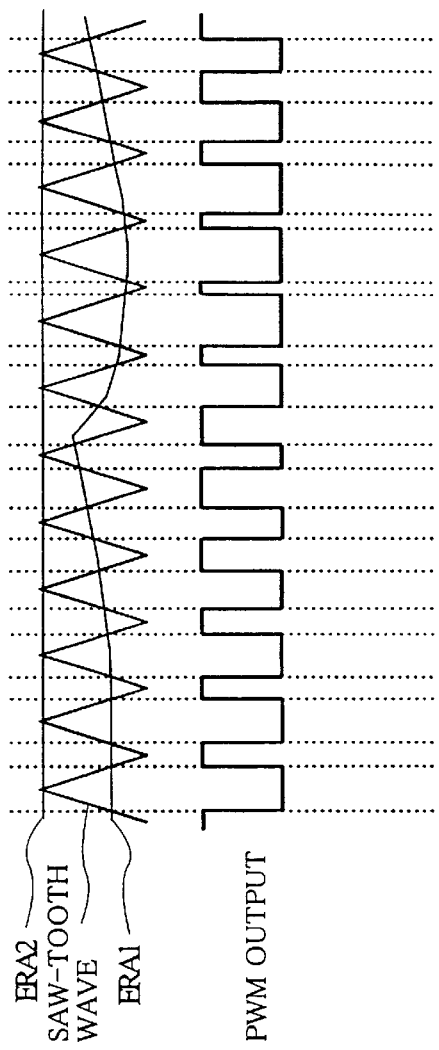
FIGS. 4A and 4B show example operation waveforms of the conventional power supply control IC in a voltage control operation.
Figures 5A, 5B:
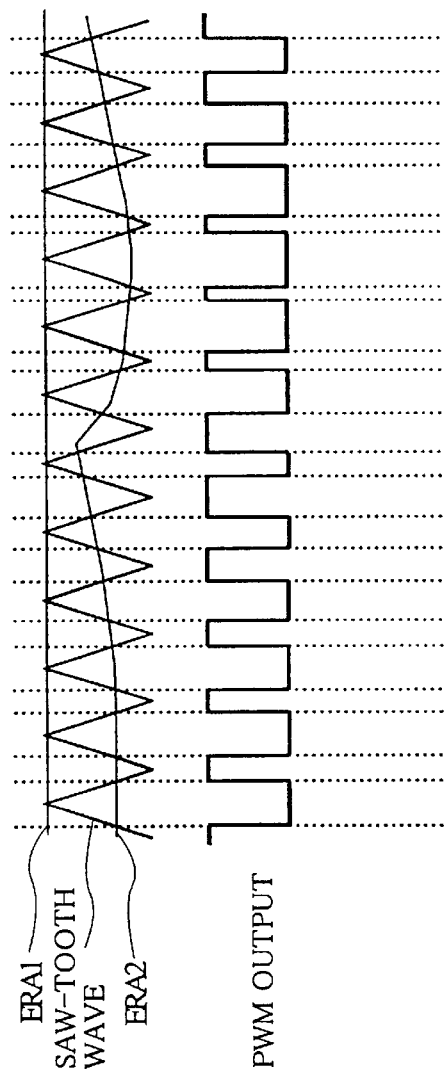
FIGS. 5A and 5B show example operation waveforms of the conventional power supply control IC in a current control operation.

A DC-DC converter 100 of this embodiment is used as any of the DC-DC converters 7-1 to 7-3 contained in the electronic apparatus shown in FIG. 1. In this DC-DC converter 100, the current sense resistor R1 is substituted for by the ON-resistance of the main switching transistor Tr1. The DC-DC converter 100 of this embodiment comprises a resistor R4, instead of the current sense resistor R1, and also comprises a power supply control IC 110 that has a different structure from the power supply control IC 10 shown in FIG. 3.

Figure 2:
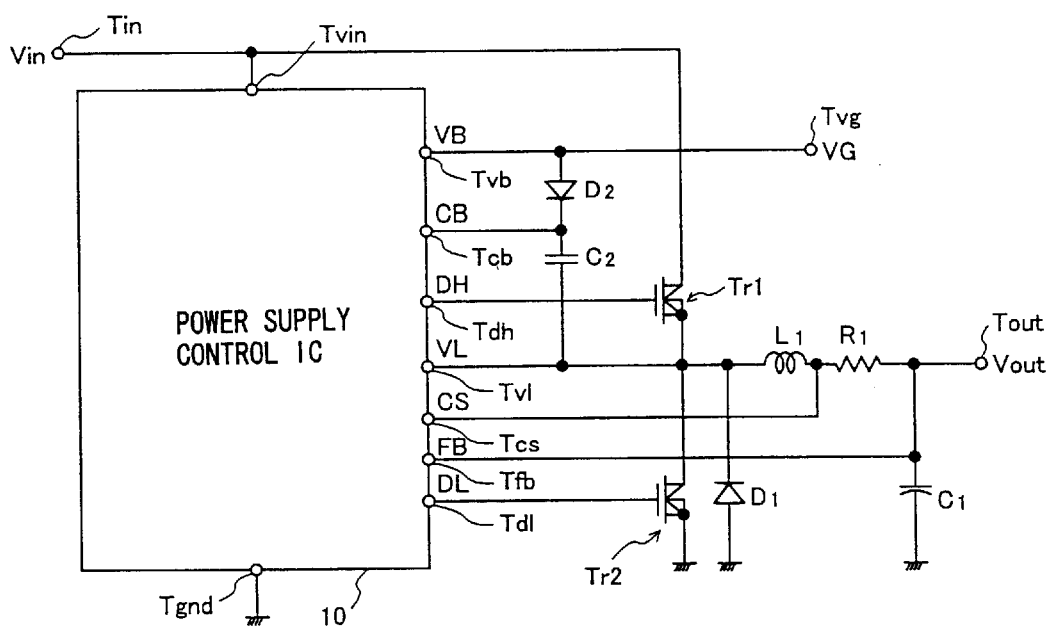
FIG. 2 is a block diagram of a conventional DC-DC converter.

The power supply control IC 110 comprises a terminal Ti1, instead of the terminal Tcs of the power supply control IC 10 shown in FIG. 2. The resistor R4 is disposed between the terminal Ti1 and the terminal Tvin of the power supply control IC 110.

Figure 6:
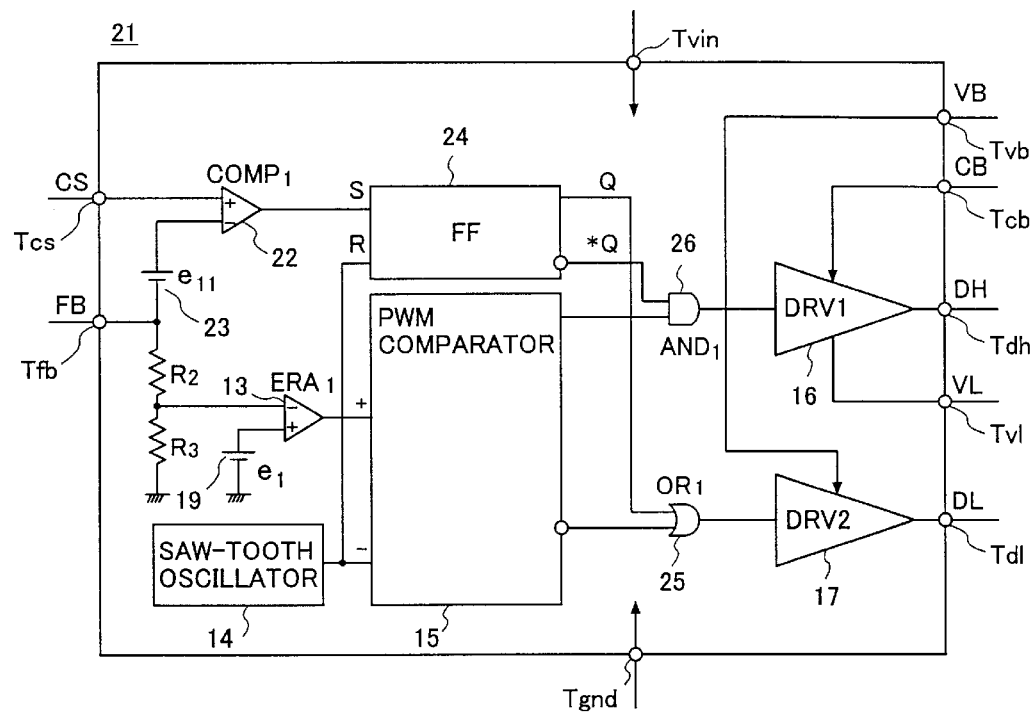
FIG. 6 is a block diagram of another conventional power supply IC.
Figure 7:
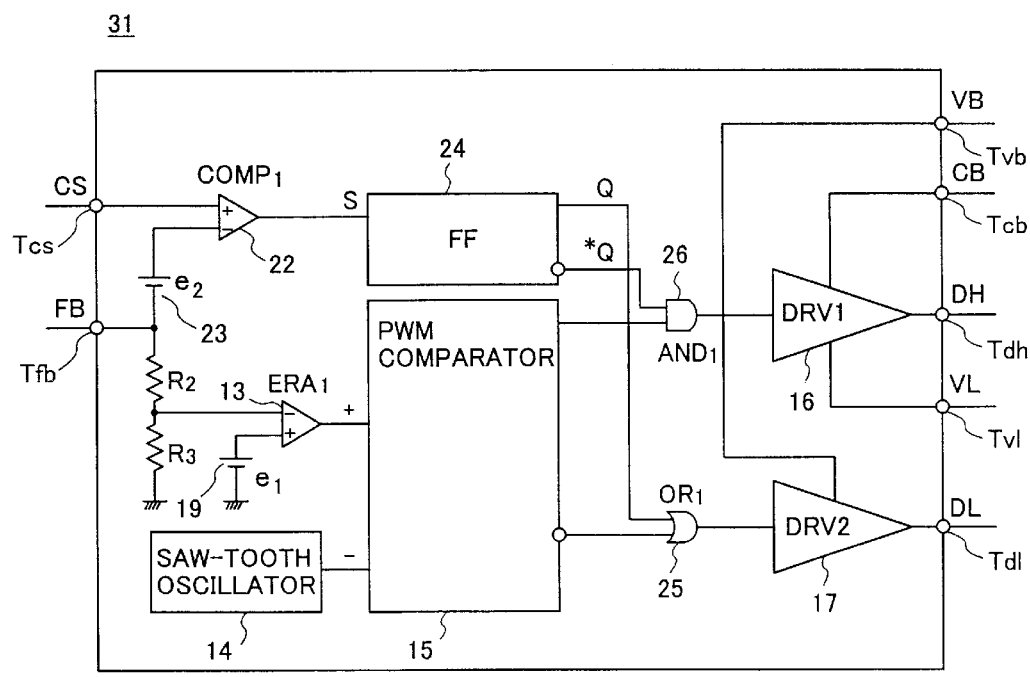
FIG. 7 is a block diagram of yet another conventional power supply IC.
Figure 9:
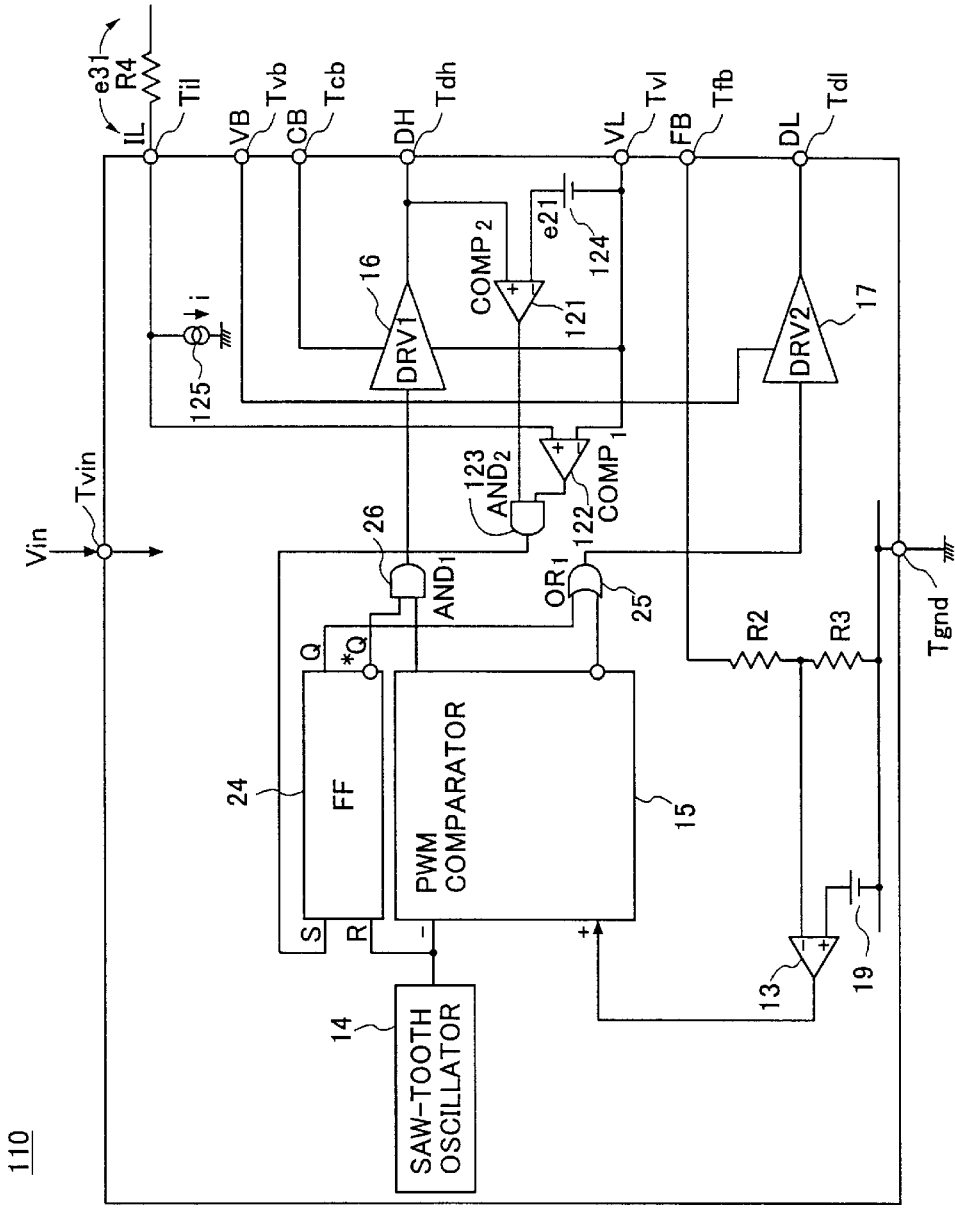
FIG. 9 is a block diagram of a power supply control IC of the DC-DC converter of FIG. 8.

FIG. 9 is a block diagram of the power supply control IC 110 of this embodiment of the present invention. In this figure, the same components as in FIG. 6 are denoted by the same reference numerals, and explanations for those components are omitted.

The power supply control IC 110 comprises comparators 121 and 122 in place of the comparator 22 and the reference voltage source 23, an AND gate 123, a reference voltage source 124, and a constant current source 125.

The non-inverting input terminal of the comparator 121 is connected to the terminal Tdh, while the inverting input terminal thereof is connected to the terminal Tv1 via the reference voltage source 124. The comparator 121 outputs a signal that is high when the gate-source voltage of the main switching transistor Tr1 is higher than a reference voltage e21 of the reference voltage source 124. The signal outputted from the comparator 121 is low when the gate-source voltage is lower than the reference voltage e21 of the reference voltage source 124. In accordance with the comparison result of the comparator 121, whether or not the main switching transistor Tr1 is in the ON state can be determined.

The non-inverting input terminal of the comparator 122 is connected to the terminal Ti1, while the inverting input terminal thereof is connected to the terminal Tv1. The constant current source 125 is disposed between the terminal Ti1 and the ground. The constant current source 25 draws current through the resistor R4 so as to generate a reference voltage e31 across the resistor R4. The comparator 122 outputs a signal that is high when the drain-source voltage of the main switching transistor Tr1 is higher than the reference voltage e31. The signal outputted from the comparator 122 is low when the drain-source voltage of the main switching transistor Tr1 is lower than the reference voltage e31. In accordance with the comparison result of the comparator 122, the output current can be judged.

The outputs of the comparators 121 and 122 are supplied to the AND gate 123. The AND gate 123 performs an AND logic operation on the outputs of the comparators 121 and 122.

The output of the AND gate 123 is supplied to the set terminal of the flip-flop 24. The flip-flop 24 is set when the output of the comparator 121 is high, i.e., the main switching transistor Tr1 is in the ON state, and the output of the comparator 122 is high, i.e., the drain-source current of the main switching transistor Tr1 is greater than a predetermined value.

Figure 10:
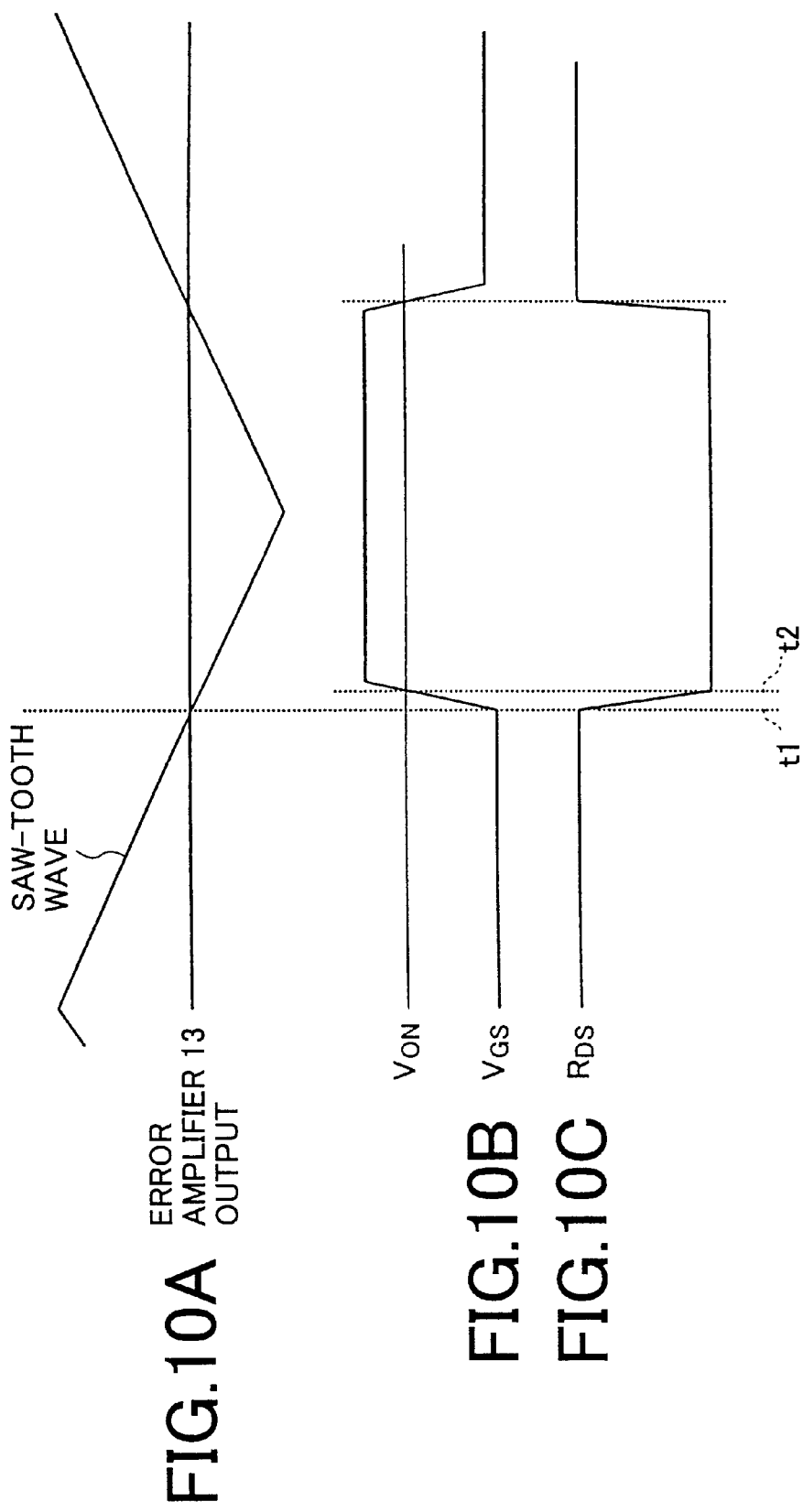
FIGS. 10A to 10C illustrate an operation of the power supply control IC of FIG. 9.

FIGS. 10A to 10C illustrate an operation of the power supply control IC 110 of this embodiment. More specifically, FIG. 10A shows the output of the error amplifier 13 and the saw-tooth wave outputted from the saw-tooth oscillator 14. FIG. 10B shows the gate-source voltage Vgs of the main switching transistor Tr1. FIG. 10C shows the drain-source resistance Rds of the main switching transistor Tr1.

When the saw-tooth wave outputted from the saw-tooth oscillator 14 becomes smaller than the output of the error amplifier at time t1, the output of the PWM comparator 15 becomes high. As the output of the PWM comparator 15 becomes high, the output of the drive amplifier 16 becomes high. The output of the drive amplifier 16 is supplied to the gate of the main switching transistor Tr1 via the terminal Tdh.

As the gate of the main switching transistor Tr1 becomes high, the gate-source voltage Vgs of the main switching transistor Tr1 rises as shown in FIG. 10B. As the gate-source voltage Vgs rises, the main switching transistor Tr1 is switched on, and the drain-source resistance Rds drops as shown in FIG. 10C.

When the gate-source voltage Vgs reaches an ON-voltage Von at time t2, the drain-source resistance Rds of the main switching transistor Tr1 reaches the minimum value, as shown in FIG. 10C. Accordingly, the ON-state of the main switching transistor Tr1 can be accurately detected by setting the reference voltage e21 of the reference voltage source 124 at a value greater than the ON-voltage Von. Thus, a current value can be invariably detected with a constant value.

In this embodiment, when the main switching transistor Tr1 is certainly in the ON state, excess current can be detected by detecting the current flowing through the main switching transistor Tr1, using the ON-resistance of the main switching transistor Tr1. Accordingly, the current sense resistor can be omitted, and excessive power consumption can be avoided.

Although the reference voltage source 124 is used to detect the ON-state of the main switching transistor Tr1 in this embodiment, a divided voltage of the drain-source voltage of the main switching transistor Tr1 may be used, instead of the reference voltage source 124.

Figure 11:
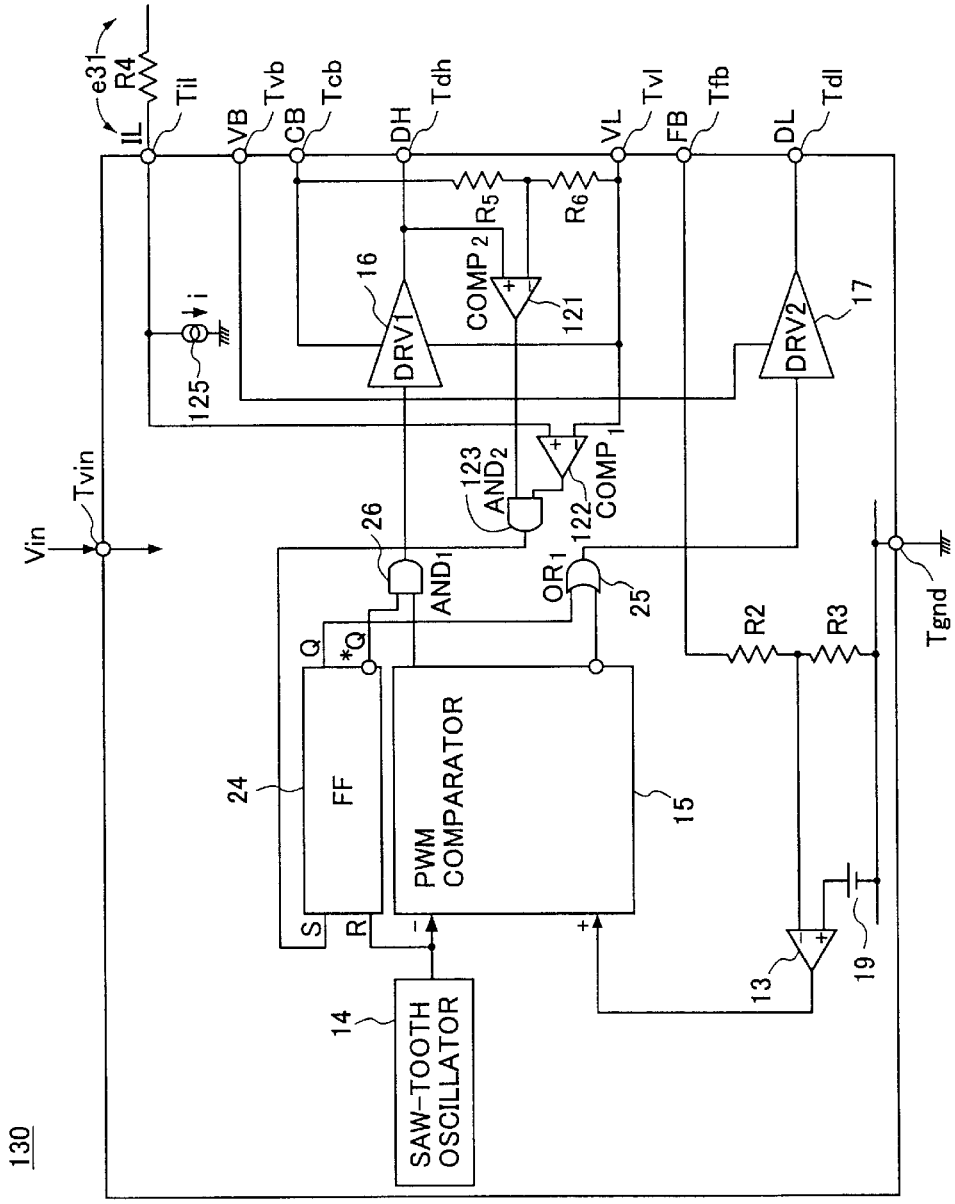
FIG. 11 is a block diagram of a first modification of the power supply control IC of the present invention.

FIG. 11 is a block diagram of a first modification of the power supply control IC 110 of the present invention. In this figure, the same components as in FIG. 9 are denoted by the same reference numerals, and explanations for those components are omitted in the following description.

A power supply control IC 130 of this modification comprises resistors R5 and R6 in place of the reference voltage source 124. The resistors R5 and R6 are connected in series between the terminal Tcb and the terminal Tv1, and the connection point of the resistors R5 and R6 is connected to the inverting input terminal of the comparator 121.

In this modification, the voltage of the terminal Tcb, which is connected to the external power terminal Tvg via the diode D2, is divided by the resistors R5 and R6, and the divided voltage may be adjusted by varying the voltage VG applied to the external power terminal Tvg. Thus, the voltage detected in the comparator 122 can be varied.

Figure 12:
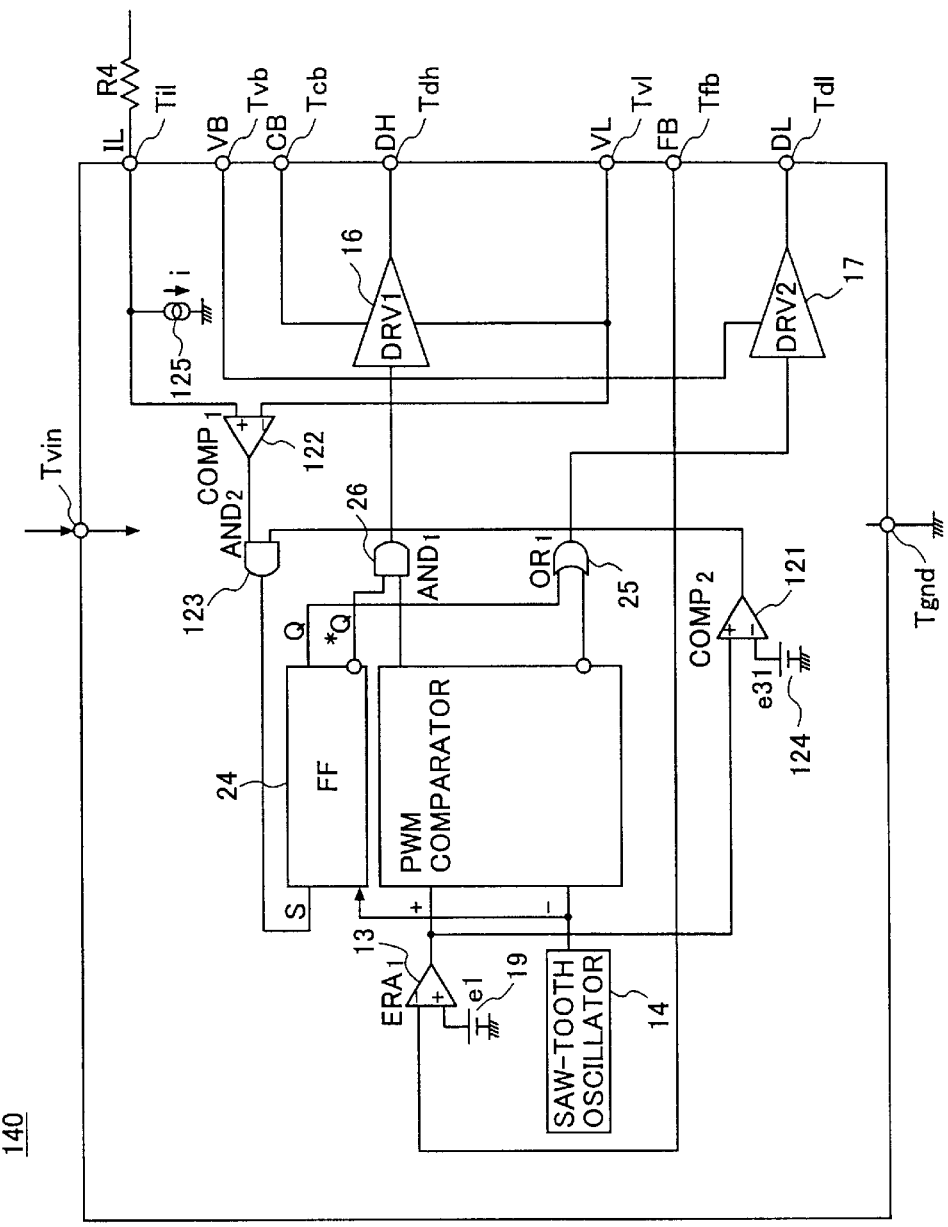
FIG. 12 is a block diagram of a second modification of the power supply control IC of the present invention.

FIG. 12 is a block diagram of a second modification of the power supply control IC of the present invention. In this figure, the same components as in FIG. 9 are denoted by the same reference numerals, and explanations for those components are omitted in the following description.

In a power supply control IC 140 of this modification, the non-inverting input terminal of the comparator 121 is connected to the output of the error amplifier 13.

In this modification, when the output of the error amplifier 13 is greater than the reference voltage e31 of the reference voltage source 124, excess current can be detected. Here, the main switching transistor Tr1 is in the ON-state when the flip-flop 24 is not in the reset state.

Figure 13:
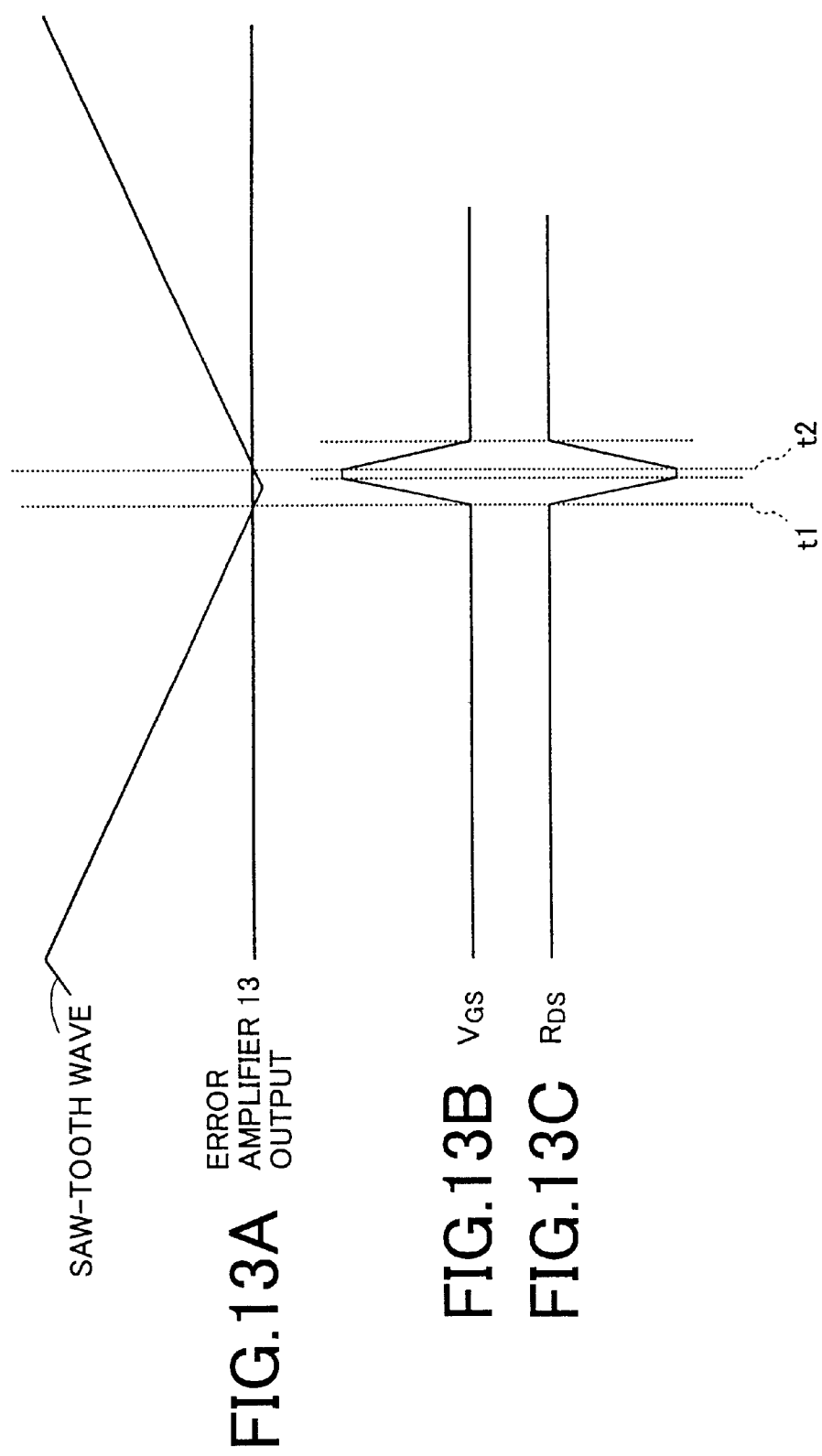
FIGS. 13A to 13C illustrate an operation of the second modification of the power supply control IC of the present invention.

FIG. 13 shows an operation of the second modification of the power supply control IC of the present invention. More specifically, FIG. 13A shows the output of the error amplifier 13 and the saw-tooth wave outputted from the saw-tooth oscillator 14. FIG. 13B shows the gate-source voltage Vgs of the main switching transistor Tr1. FIG. 13C shows the drain-source resistance Rds of the main switching transistor Tr1.

If the output of the error amplifier 13 is too low as shown in FIG. 13A, the period of time during which the gate-source voltage vgs of the main switching transistor Tr1 is an ON-voltage is very short as shown in FIG. 13B. As a result, the time required for the drain-source resistor Rds of the main switching transistor Tr1 to be the smallest value cannot be maintained, and a drop of the voltage flowing through the main switching transistor Tr1 cannot be accurately measured.

As can be seen from the above fact, when the output of the error amplifier 13 is greater than the reference voltage e31 of the reference voltage source 124, an ON-time can be sufficiently maintained for the main switching transistor Tr1. Accordingly, a decrease of the voltage flowing through the main switching transistor Tr1 can be accurately measured.

In the foregoing embodiments, each of the power supply control ICs 110, 130, and 140 performs an operation current control operation. However, these power supply control ICs 110, 130, and 140 may perform an excess current control operation.

Figure 14:
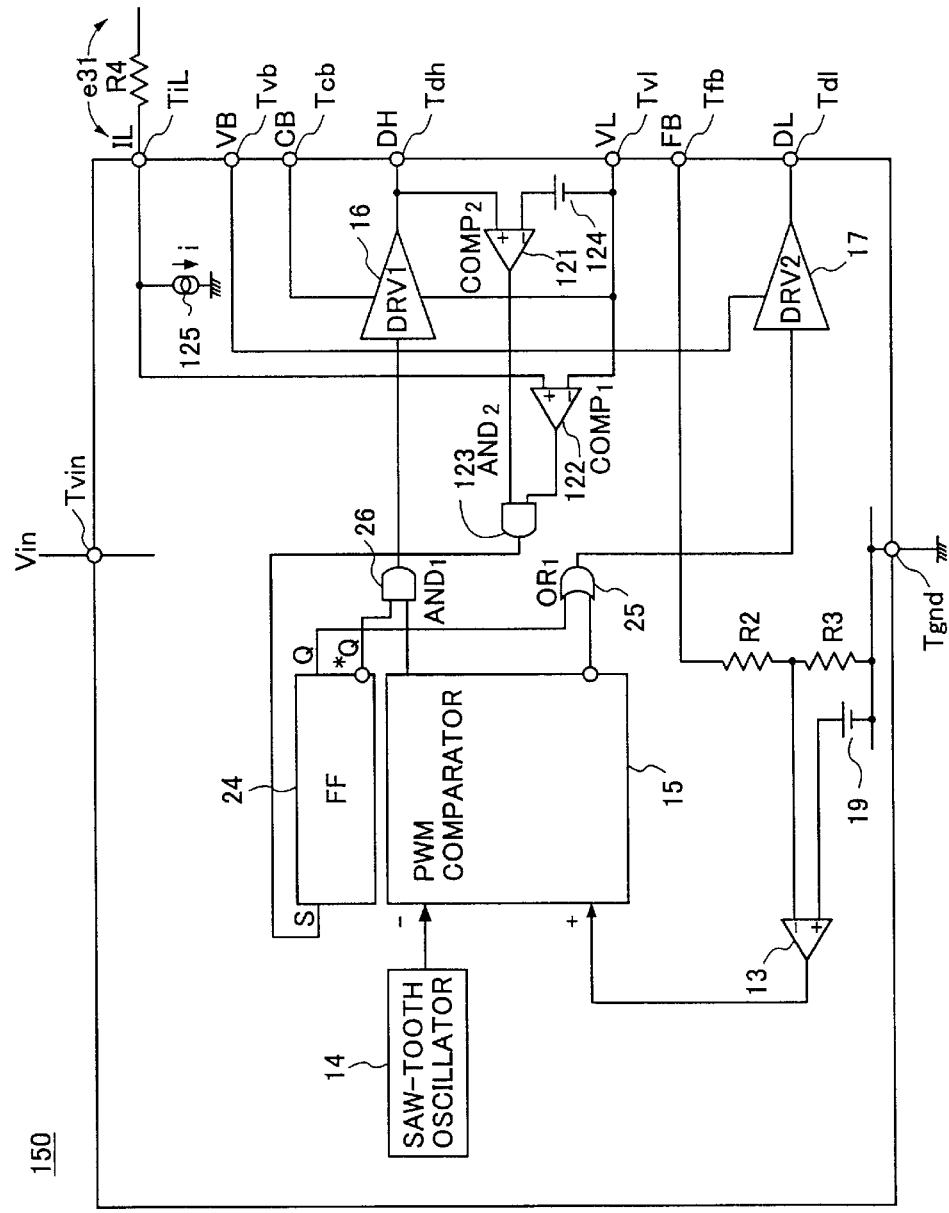
FIG. 14 is a block diagram of a third modification of the power supply control IC of the present invention.

FIG. 14 is a block diagram of a third modification of the power supply control IC of the present invention. In this figure, the same components as in FIG. 9 are denoted by the same reference numerals, and explanations for those components are omitted in the following description.

A power supply control IC 150 of this modification differs from the power supply control IC 110 of FIG. 9 in that the flip-flop 24 is not reset.

Figure 15:
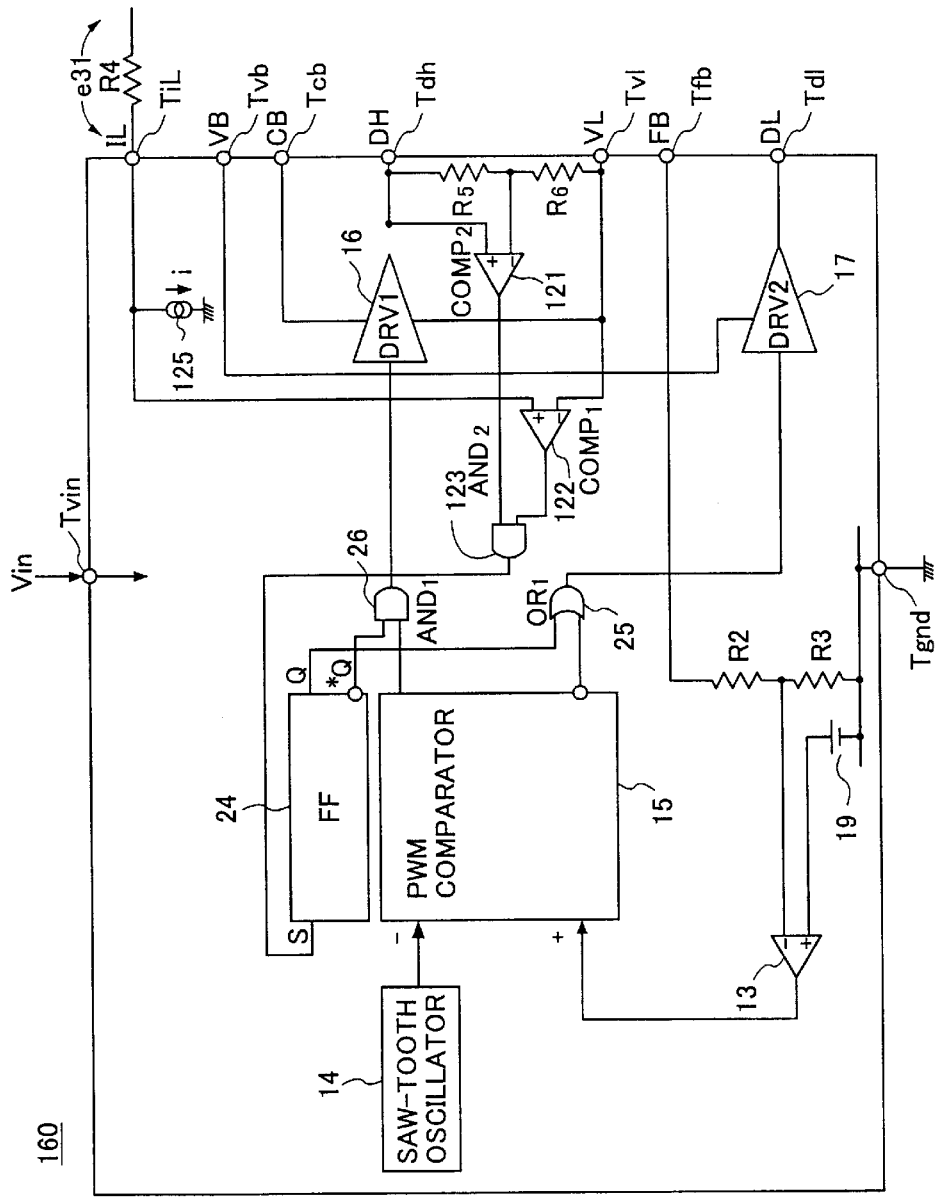
FIG. 15 is a block diagram of a fourth modification of the power supply control IC of the present invention.

FIG. 15 is a block diagram of a fourth embodiment of the power supply control IC of the present invention. In this figure, the same components as in FIG. 11 are denoted by the same reference numerals, and explanations for those components are omitted in the following description.

A power supply control IC 160 of this modification differs from the power supply control IC 130 of FIG. 11 in that the flip-flop 24 is not reset.

Although the ON-state of the main switching transistor Tr1 is detected from the gate-source voltage of the main switching transistor Tr1 in each of the power supply control ICs 110, 130, 140, and 150, the ON-state of the main switching transistor Tr1 may be detected from the output voltage Vout.

Figure 16:
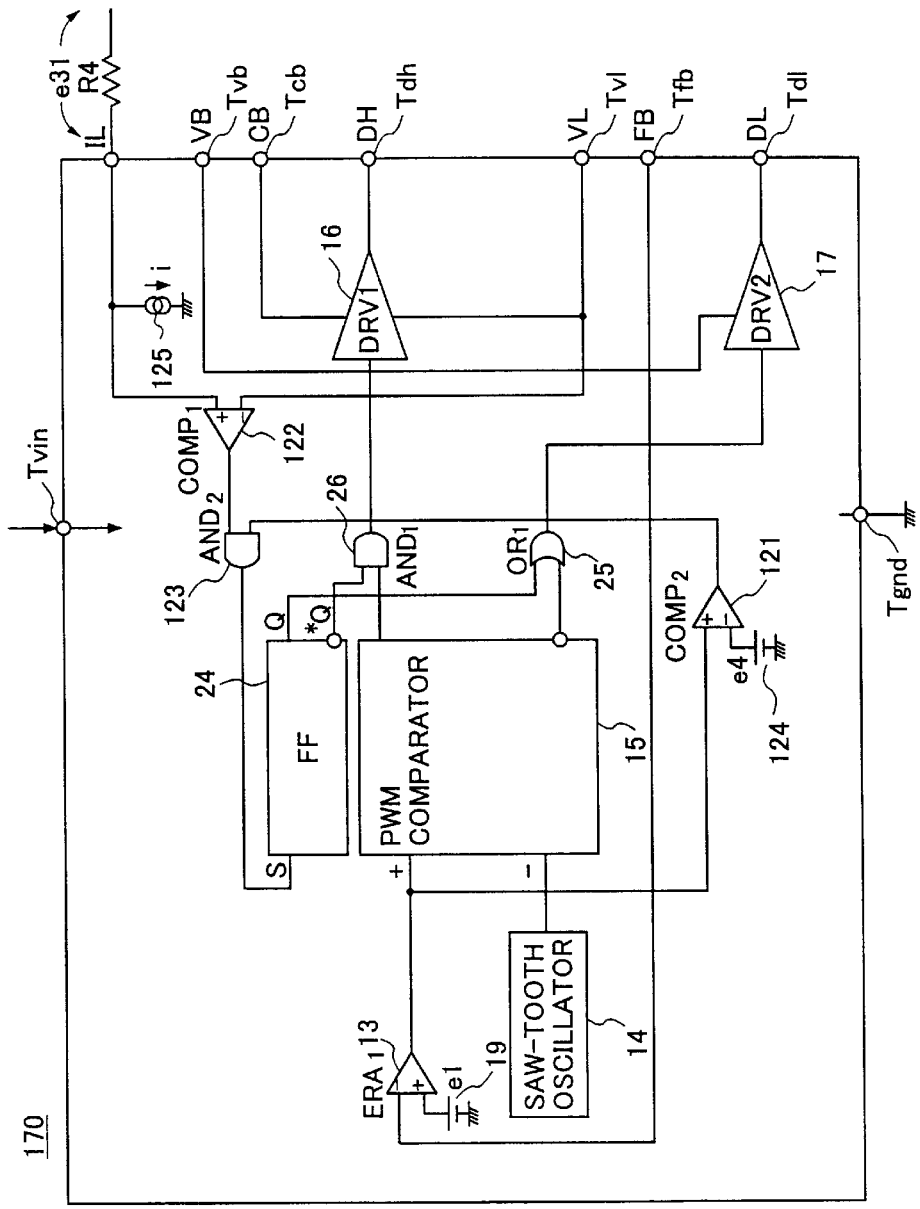
FIG. 16 is a block diagram of a fifth modification of the power supply control IC of the present invention.

FIG. 16 is a block diagram of a fifth embodiment of the power supply control IC of the present invention. In this figure, the same components as in FIG. 12 are denoted by the same reference numerals, and explanations for those components are omitted in the following description.

A power supply control IC 170 differs from the power supply control IC 140 of FIG. 12 in that the flip-flop 24 is not reset.

As described so far, in accordance with the present invention, the output current of a DC-DC converter can be measured using the ON-resistance of the main switching transistor Tr1, instead of the current sense resistor. In the present invention, the gate-source voltage Vgs of the main switching transistor Tr1 is monitored. When the gate-source voltage is higher than a predetermined value, the drain-source voltage of the main switching transistor Tr1 is measured so as to measure the current flowing through the main switching transistor Tr1. Accordingly, the drain-source voltage of the main switching transistor Tr1 is measured while the main switching transistor Tr1 is certainly in the ON state. Thus, a wrong detection can be avoided.

The present invention is not limited to the specifically disclosed embodiments, but variations and modifications may be made without departing from the scope of the present invention.

The present application is based on Japanese priority application No. 2000-076994, filed on Mar. 17, 2000, the entire contents of which are hereby incorporated by reference.

What is claimed is:

1. A power supply control device to which a switching element, which is connected at opposite terminals thereof in series with a load, is connected, and which controls power supply to the load by supplying a control signal to the switching element to switch from an OFF-state to an ON-state, said device comprising:

an ON-state detection unit that detects a gate-source voltage of the switching element to determine whether or not the switching element is in the ON state; and a voltage detection unit, connected to the opposite terminals of the switching element, that detects, at the opposite terminals, a voltage generated across the switching element when the switching element is in the ON state.

2. The power supply control device as claimed in claim 1, wherein the ON-state detection unit determines whether or not the switching element is in the ON state in accordance with the control signal.

3. The power supply control device as claimed in claim 1, wherein the ON-state detection unit comprises a comparison unit that compares a gate-source voltage of the switching element with a predetermined voltage.

4. The power supply control device as claimed in claim 3, wherein the predetermined voltage can be set based on an externally supplied voltage.

5. The power supply control device as claimed in claim 1, wherein the ON-state detection unit comprises:
an error detection unit that detects a potential difference between an output voltage and a first predetermined voltage; and
a comparison unit that compares the potential difference detected by the error detection unit with a second predetermined voltage.

6. The power supply control device as claimed in claim 5, wherein the second predetermined voltage can be set based on an externally supplied voltage.

7. The power supply control device as claimed in claim 1, wherein the ON-state detection unit comprises a comparison unit that compares a drain-source voltage of the switching element with a predetermined voltage.

8. A power supply control device that switches a switching transistor, connected at opposite terminals thereof to said device and in series between an input terminal and an output terminal to a load, said device comprising:
a switching control unit that switches the switching transistor in accordance with a switching control signal based on an output voltage of the output terminal;
a state detection unit that detects a gate-source voltage of the switching element to determine whether or not the switching transistor is in an ON state;
a voltage detection unit that is connected to the opposite terminals of the switching element to detect a voltage generated across the switching element and that determines whether or not the voltage across the switching transistor is higher than a predetermined voltage and outputs a detection signal if said voltage is greater than the predetermined voltage during the ON-state of the switching element; and
a gate unit that stops supplying the switching control signal to the switching transistor when the switching transistor is in the ON state and the voltage detected by the voltage detection unit is higher than the predetermined voltage.

9. A power supply device, comprising:
a switching element which is connected in series with a load and which controls an output voltage;
a power supply control unit that controls the switching element based on the output voltage;
an ON-state detection unit that detects a gate-source voltage of the switching element to determine whether or not the switching element is in the ON state; and
a voltage detection unit that is connected to the opposite terminals of the switching element to detect a voltage generated across the switching element and that detects the voltage generated across the switching element when the switching element is in the ON state.

10. The power supply device as claimed in claim 9, wherein the ON-state detection unit determines whether or not the switching element is in the ON state in accordance with a control signal for controlling the switching element.

11. The power supply device as claimed in claim 9, wherein the ON-state detection unit comprises a comparison unit that compares a gate-source voltage of the switching element with a predetermined voltage.

12. The power supply device as claimed in claim 11, wherein the predetermined voltage can be set based on an externally supplied voltage.

13. The power supply device as claimed in claim 9, wherein the ON-state detection unit comprises:
an error detection unit that detects a potential difference between the output voltage and a first predetermined voltage; and
a comparison unit that compares the potential difference detected by the error detection unit with a second predetermined voltage.

14. The power supply device as claimed in claim 13, wherein the second predetermined voltage can be set based on an externally supplied voltage.

15. The power supply device as claimed in claim 9, wherein the ON-state detection unit comprises a comparison unit that compares a drain-source voltage of the switching element with a predetermined voltage.

16. A power supply control method employing a switching element connected at opposite terminals thereof in series between a power supply source and a load, comprising the steps of:
detecting a gate-source voltage of the switching element to determine whether or not the switching element is in an ON state;
detecting a voltage generated across the switching element at the opposite terminals thereof when the switching element is in the ON-state and outputting a detection signal if said detected voltage is greater than a predetermined voltage during the ON-state of the switching element; and
controlling an output voltage based on the detected voltage generated across the switching element.

17. The power supply control method as claimed in claim 16, wherein the step of determining whether or not the switching element is in the ON state is performed in accordance with a control signal for controlling the switching element.

18. The power supply control method as claimed in claim 16, wherein the step of determining whether or not the switching element is in the ON state is performed in accordance with a result of a comparison between a gate-source voltage of the switching element and a predetermined voltage.

19. The power supply control method as claimed in claim 18, wherein the predetermined voltage can be set based on an externally supplied voltage.

20. The power supply control method as claimed in claim 16, further comprising the step of detecting a potential difference between the output voltage and a first predetermined voltage,
wherein the step of determining whether or not the switching element is in the ON state is performed based on a result of a comparison between the potential difference and a second predetermined voltage.

21. The power supply control method as claimed in claim 20, wherein the second predetermined voltage can be set based on an externally supplied voltage.

22. The power supply control method as claimed in claim 16, wherein the step of determining whether or not the switching element is in the ON state is performed in accordance with a result of a comparison between a drain-source voltage of the switching element and a predetermined voltage.

23. An electronic apparatus comprising:
a switching element connected at opposite terminals thereof in series between a power source and a load; and
a power supply control device that converts an input voltage into a predetermined driving voltage and supplies the predetermined driving voltage to an internal device,
wherein the power supply control device detects a gate-source voltage of the switching element to determine whether or not the switching element is in an ON-state, detects a voltage generated across the switching element at the opposite terminals thereof when the switching element is in the ON state and outputs a detection signal if said voltage is greater than a predetermined voltage during the ON-state of the switching element, and controls the driving voltage in accordance with detection signal.

24. The electronic apparatus as claimed in claim 23, wherein the power supply control device determines whether or not the switching element is in the ON state, in accordance with a control signal for controlling the switching element.

25. The electronic apparatus as claimed in claim 23, wherein the power supply control device determines whether or not the switching element is in the ON state, in accordance with a result of a comparison between a gate-source voltage of the switching element and a predetermined voltage.

26. The electronic apparatus as claimed in claim 25, wherein the predetermined voltage can be set based on an externally supplied voltage.

27. The electronic apparatus as claimed in claim 23, wherein the power supply control device detects a potential difference between the output voltage and a first predetermined voltage, and then determines whether or not the switching element is in the ON state, in accordance with a result of a comparison between the potential difference and a second predetermined voltage.

28. The electronic apparatus as claimed in claim 27, wherein the second predetermined voltage can be set based on an externally supplied voltage.

29. The electronic apparatus as claimed in claim 23, wherein the power supply control device determines whether or not the switching element is in the ON state, in accordance with a result of a comparison between a drain-source voltage of the switching element and a predetermined voltage.

30. A power supply circuit having a switching element connected in series with a load and supplying a control signal to the switching element to switch from an OFF-state to an ON-state to provide power supply current to the load, comprising:
an ON-state detection unit that detects a gate-source voltage of the switching element to determine whether or not the switching element is in the ON-state, the switching element having an ON-state resistance and serving exclusively as a current sense resistor in series with the load; and
a voltage detection unit that detects a voltage generated across the switching element in accordance with the ON-state resistance thereof when the switching element is in the ON-state.

31. The power supply control device as claimed in claim 30, wherein the ON-state detection unit determines whether or not the switching element is in the ON-state in accordance with the control signal.

32. The power supply control device as claimed in claim 30, wherein the ON-state detection unit comprises a comparison unit that compares a gate-source voltage of the switching element with a predetermined voltage.

33. The power supply control device as claimed in claim 32, wherein the predetermined voltage can be set based on an externally supplied voltage.

34. The power supply control device as claimed in claim 30, wherein the ON-state detection unit comprises:
an error detection unit that detects a potential difference between an output voltage and a first predetermined voltage; and
a comparison unit that compares the potential difference detected by the error detection unit with a second predetermined voltage.

35. The power supply control device as claimed in claim 34, wherein the second predetermined voltage can be set based on an externally supplied voltage.

36. The power supply control device as recited in claim 1, wherein the switching element serves exclusively as a current sense resistor in series with the load.

37. The power supply control device as recited in claim 8, wherein the switching element serves exclusively as a current sense resistor in series with the load.

38. The power supply control device as recited in claim 9, wherein the switching element serves exclusively as a current sense resistor in series with the load.

39. The power supply control method as recited in claim 16, wherein the switching element serves exclusively as a current sense resistor in series with the load.

40. The power supply control device as recited in claim 23, wherein the switching element serves exclusively as a current sense resistor in series with the load.

41. The power supply control device as recited in claim 1, wherein the switching element employs no element other than the ON-state resistance of the switching element as a current sense resistor and across the opposite terminals of which the voltage detected by the voltage detection unit is detected, thereby eliminating power loss caused by a conventional, separate current sense resistor connected between the switching element and the load and through which power supply current flows to the load.

42. The power supply control device as recited in claim 8, wherein the switching element employs no element other than the ON-state resistance of the switching element as a current sense resistor and across the opposite terminals of which the voltage detected by the voltage detection unit is detected, thereby eliminating power loss caused by a conventional, separate current sense resistor connected between the switching element and the load and through which power supply current flows to the load.

43. The power supply control device as recited in claim 9, wherein the switching element employs no element other than the ON-state resistance of the switching element as a current sense resistor and across the opposite terminals of which the voltage detected by the voltage detection unit is detected, thereby eliminating power loss caused by a conventional, separate current sense resistor connected between the switching element and the load and through which power supply current flows to the load.

44. The power supply control device as recited in claim 16, wherein the switching element employs no element other than the ON-state resistance of the switching element as a current sense resistor and across the opposite terminals of which the voltage detected by the voltage detection unit is detected, thereby eliminating power loss caused by a conventional, separate current sense resistor connected between the switching element and the load and through which power supply current flows to the load.

45. The power supply control device as recited in claim 23, wherein the switching element employs no element other than the ON-state resistance of the switching element as a current sense resistor and across the opposite terminals of which the voltage detected by the voltage detection unit is detected, thereby eliminating power loss caused by a conventional, separate current sense resistor connected between the switching element and the load and through which power supply current flows to the load.

46. The power supply control device as recited in claim 30, wherein the switching element employs no element other than the ON-state resistance of the switching element as a current sense resistor and across the opposite terminals of which the voltage detected by the voltage detection unit is detected, thereby eliminating power loss caused by a conventional, separate current sense resistor connected between the switching element and the load and through which power supply current flows to the load.

47. A power supply circuit having a switching element connected in series with a load and supplying a control signal to the switching element to switch from an OFF-state to an ON-state to provide power supply current to the load, the power supply circuit eliminating power loss otherwise caused by a current sense resistor of a conventional power supply circuit and comprising:
  an ON-state detection unit that detects a gate-source voltage of the switching element to determine whether or not the switching element is in the ON-state, the switching element having an ON-state resistance, used as a substitute for the current sense resistor of a conventional power supply circuit, connected in series with the load; and
  a voltage detection unit that detects a voltage generated across the switching element in accordance with the ON-state resistance thereof when the switching element is in the ON-state.

* * * * *